United States Patent [19]
van Berkum

[11] Patent Number: 5,579,368
[45] Date of Patent: Nov. 26, 1996

[54] DEVICE FOR MONITORING A SWITCH

[75] Inventor: Paul van Berkum, Winfield, Ill.

[73] Assignee: Rockwell International Corporation, Seal Beach, Calif.

[21] Appl. No.: 235,268

[22] Filed: Apr. 29, 1994

Related U.S. Application Data

[63] Continuation of Ser. No. 884,678, May 18, 1992, abandoned.

[51] Int. Cl.⁶ .............................. H04M 3/08; H04M 3/22
[52] U.S. Cl. .................. 379/15; 379/9; 379/10; 379/16; 379/17; 379/32; 379/33; 379/34
[58] Field of Search .......................... 379/9–11, 15–19, 379/32, 33, 34, 45

[56] References Cited

U.S. PATENT DOCUMENTS

| | | | |
|---|---|---|---|
| 3,626,383 | 12/1971 | Oswald et al. | 379/10 |
| 3,692,961 | 9/1972 | Le Strat | 379/11 |
| 3,692,962 | 9/1972 | Raczynski et al. | 379/11 |
| 3,840,712 | 10/1974 | Oberer et al. | 379/11 |
| 3,851,122 | 11/1974 | Gibson | 379/16 |
| 4,255,625 | 3/1981 | Walton et al. | 379/18 |
| 4,314,110 | 2/1982 | Breidenstein et al. | 379/18 |
| 4,453,210 | 6/1984 | Suzuki et al. | 379/10 |
| 4,544,809 | 10/1985 | Stuparits et al. | 379/10 |
| 4,552,997 | 11/1985 | Daniels et al. | 379/11 |
| 4,945,554 | 7/1990 | Krause et al. | 379/15 |
| 4,953,195 | 8/1990 | Ikemori | 379/33 |
| 4,963,179 | 11/1990 | Kanare et al. | 379/33 |
| 5,065,422 | 11/1991 | Ishikawa | 379/16 |
| 5,109,399 | 4/1992 | Thompson | 379/45 |
| 5,161,180 | 11/1992 | Chavous | 379/45 |
| 5,187,732 | 2/1993 | Suzuki | 379/15 |
| 5,235,630 | 8/1993 | Moody et al. | 379/45 |
| 5,239,570 | 8/1993 | Koster et al. | 379/45 |
| 5,249,223 | 9/1993 | Vanacore | 379/45 |

Primary Examiner—Wellington Chin
Assistant Examiner—Vijay Shankar
Attorney, Agent, or Firm—C. B. Patti; G. A. Montanye

[57] ABSTRACT

A switch sentry device (22) having a digital telephony switch (SCX, 16), a device (24) for processing information, a device (24, 34) for simulating a call from the processing device (24) to the switch (SCX, 16), a device (SCX, 16) responsive to the call simulating device (24, 34) for simulating a primary ringing line (36) from the switch (SCX, 16) to the processing device (24), a device (SCX, 16) responsive to the call simulating device (24, 34) for simulation an alternate ringing line (38) from the switch (SCX, 16) to the processing device (24), and a device (24) for determining an inoperative condition of the switch (SCX, 16).

25 Claims, 6 Drawing Sheets

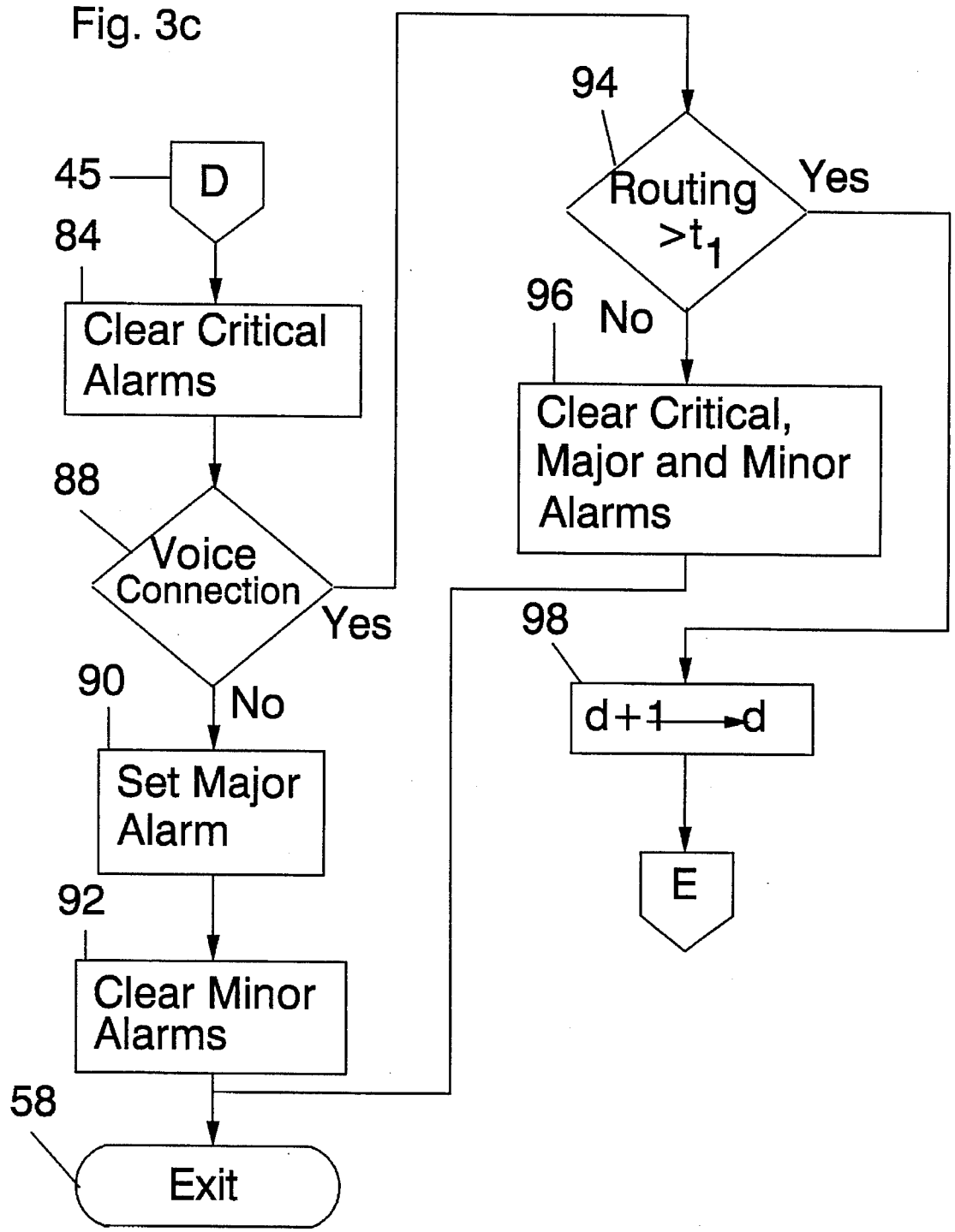

5,579,368

DEVICE FOR MONITORING A SWITCH

This is a continuation of application Ser. No. 884,678, filed May 18, 1992 now abandoned.

The present invention relates to switch sentry devices for telephone systems.

In the past, Specialized Common Exchanges (SCX) comprising a digital telephony switch have been utilized to route emergency (911) telephone calls between a local exchange to Public Service Answering Points (PSAP). Although such telephone systems have satisfactorily placed telephone calls on an emergency basis, the digital telephony switch in the system may become disabled, such that it is incapable of completing or routing calls or setting appropriate alarms. In the past, there has been no manner of verifying or determining such a fault condition, and the telephone company would be unaware of the loss of its 911 emergency service until its customers complained.

SUMMARY OF THE INVENTION

A principal feature of the present invention is the provision of a switch sentry device for a telephone system.

The sentry device of the present invention comprises, a digital telephony switch, means for processing information, means for simulating a call from the processing means to the switch, means responsive to the call simulating means for simulating a primary ringing line from the switch to the processing means, and means responsive to the call simulating means for simulating an alternate ringing line from the switch to the processing means.

A feature of the present invention is that the device simulates operation of a local telephone exchange and a public service answering point relative to the switch.

Another feature of the invention is that the device detects an inoperative condition of the switch under which the switch cannot successfully route 911 telephone calls.

Yet another feature of the invention is that the device may continuously monitor the condition of the switch.

Still another feature of the invention is that the device automatically monitors the switch for a fault condition.

Yet another feature of the invention is that the switch may be repaired or replaced when a fault condition may take place as determined by the device.

Still another feature of the invention is that the device may set an alarm responsive to an inoperative condition of the switch as determined by the device.

Another feature of the invention is that the processing means may comprise a computer, and an alarm signal may be placed on a display of the computer.

A feature of the invention is that the device may have different categories of alarms dependent upon the type and priority of malfunction in the switch.

Another feature of the present invention is that the device sets a critical alarm responsive to the conditions that no dial tone is provided by the switch to the computer, or if a call is not routed back from the switch to the computer.

Yet another feature of the invention is that the device sets a major alarm responsive to the conditions that a voice connection cannot be established through the switch of the call, the switch consistently causes alternate routing, or the switch consistently causes slow routing of the call.

A further feature of the invention is that the device sets a minor alarm responsive to the conditions of the switch occasionally alternately routing of a call, or the switch causing occasional slow routing of a call.

Thus, a feature of the invention is that the device serves a diagnostic device for the routing of 911 emergency telephone calls, and minimizes the possibility of the improper routing of an emergency call.

Further features will become more fully apparent in the following description of the embodiments of the invention, and from the appended claims.

DESCRIPTION OF THE DRAWINGS

In the drawings:

FIGS. 3A–3D is a flow chart of a program for a computer serving as the switch sentry device.

DESCRIPTION OF THE PREFERRED EMBODIMENTS

Figure 1:
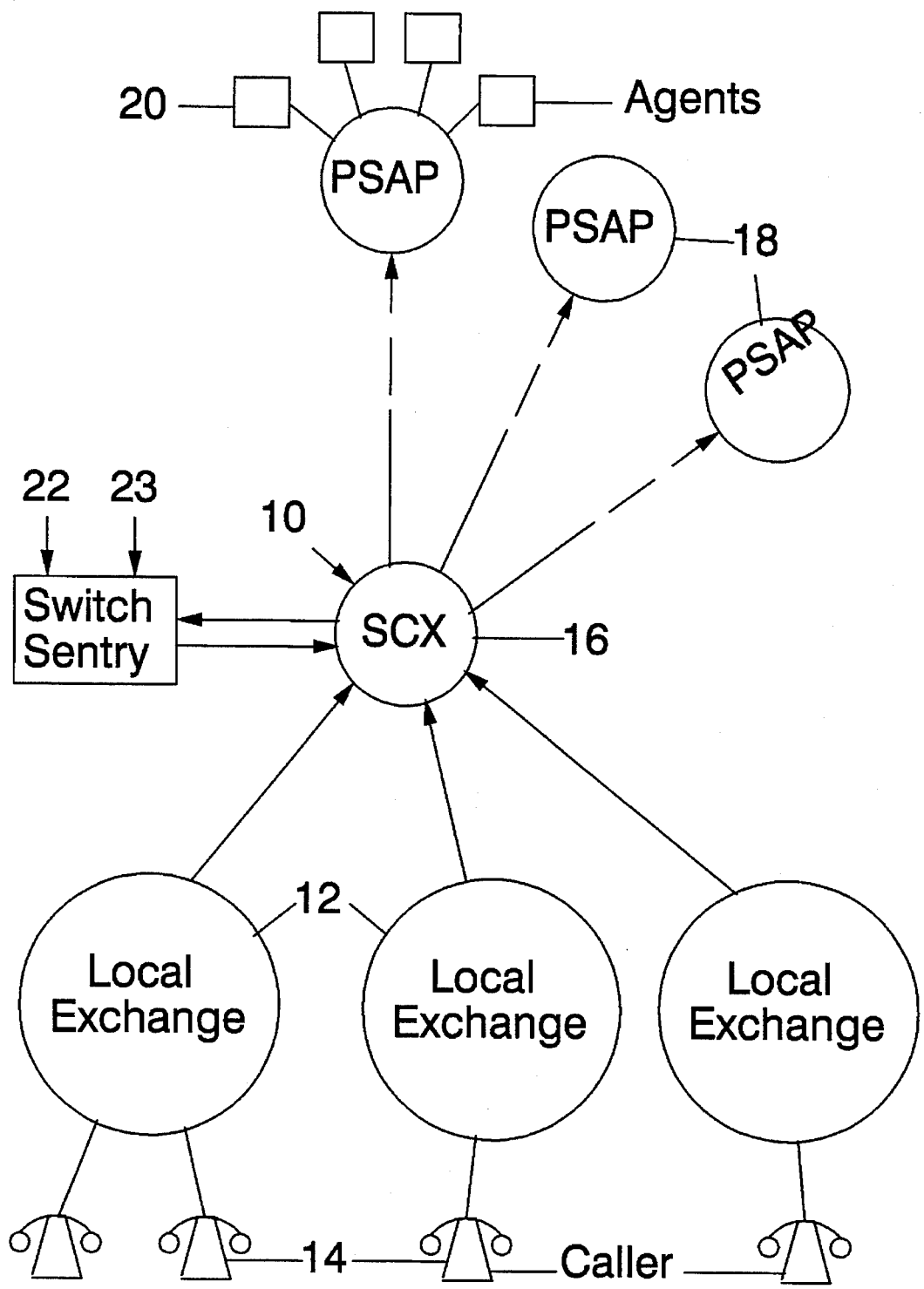
FIG. 1 is a diagrammatic view of a telephone system which routes emergency (911) telephone calls and having a switch sentry device of the present invention.

Referring now to FIG. 1, there is shown a telephone system generally designated 10, such as a 911 emergency telephone system, having a plurality of local telephone exchanges 12 serving a plurality of telephones 14 in order to route calls to a Specialized Common Exchange (SCX) 16 comprising a digital telephony switch which routes calls from the local exchanges to a plurality of Public Service Answering Points (PSAP) 18 where the emergency telephone calls are handled by a plurality of agents 20 for a particular area. As shown, the system 10 has a switch sentry generally designated 22 in a diagnostic device 23 which continuously monitors and tests the SCX 16 during operation of the system 10 in order to detect a possible inoperative condition of the switch 16 which may cause a failure in the emergency telephone system 10, and thus a failure to complete or properly route the emergency 911 calls.

Figure 2:
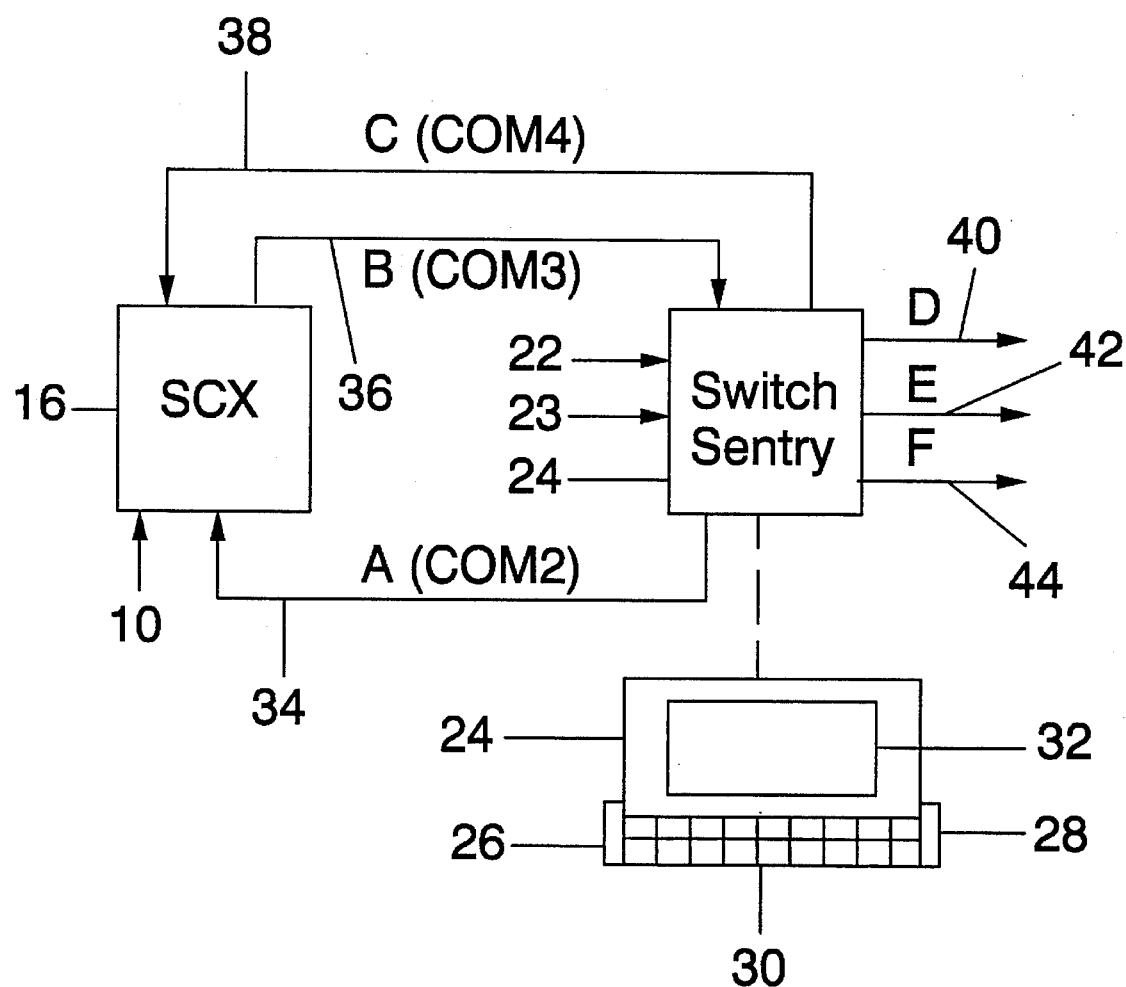
FIG. 2 is a diagrammatic view of the sentry device as connected to a digital telephony switch.

With reference to FIG. 2, the switch sentry 22 may comprise a suitable Central Processing Unit (CPU) or computer 24 having a Randomly Addressable Memory (RAM) and a Read Only Memory (ROM). The CPU may have a plurality of modems 26 communicating with the CPU or computer 24, a relay board 28 having a plurality of relays which may be set or cleared by the CPU, a keyboard 30 for the CPU, and a display 32 for the CPU.

The diagnostic device 23 has a first line (COM2) 34 communicating between a first modem 26 in the CPU and the digital switch or SCX 16 in order to simulate a 911 emergency call initiated by the CPU to the SCX. The diagnostic device 23 also has a second line (COM3) 36 communicating between the SCX and a second modem 26 in the CPU in order to simulate a "ringing PSAP" line out of the SCX which constitutes the primary route choice for the call made on the first line 34. The diagnostic device 23 also has a third line 38 communicating between the SCX and a third modem 26 in the CPU which simulates a "ringing PSAP" line out of the SCX which constitutes an alternate route choice for the call made on the line 34. The CPU is also connected by the lines 40, 42, and 44 to different relays in the relay board 28 in order to set a plurality of alarms, termed a critical alarm, a major alarm, and a minor alarm, with the critical alarm having greater priority than the major and minor alarms, and the major alarm having greater priority over the minor alarm.

Figure 3A:
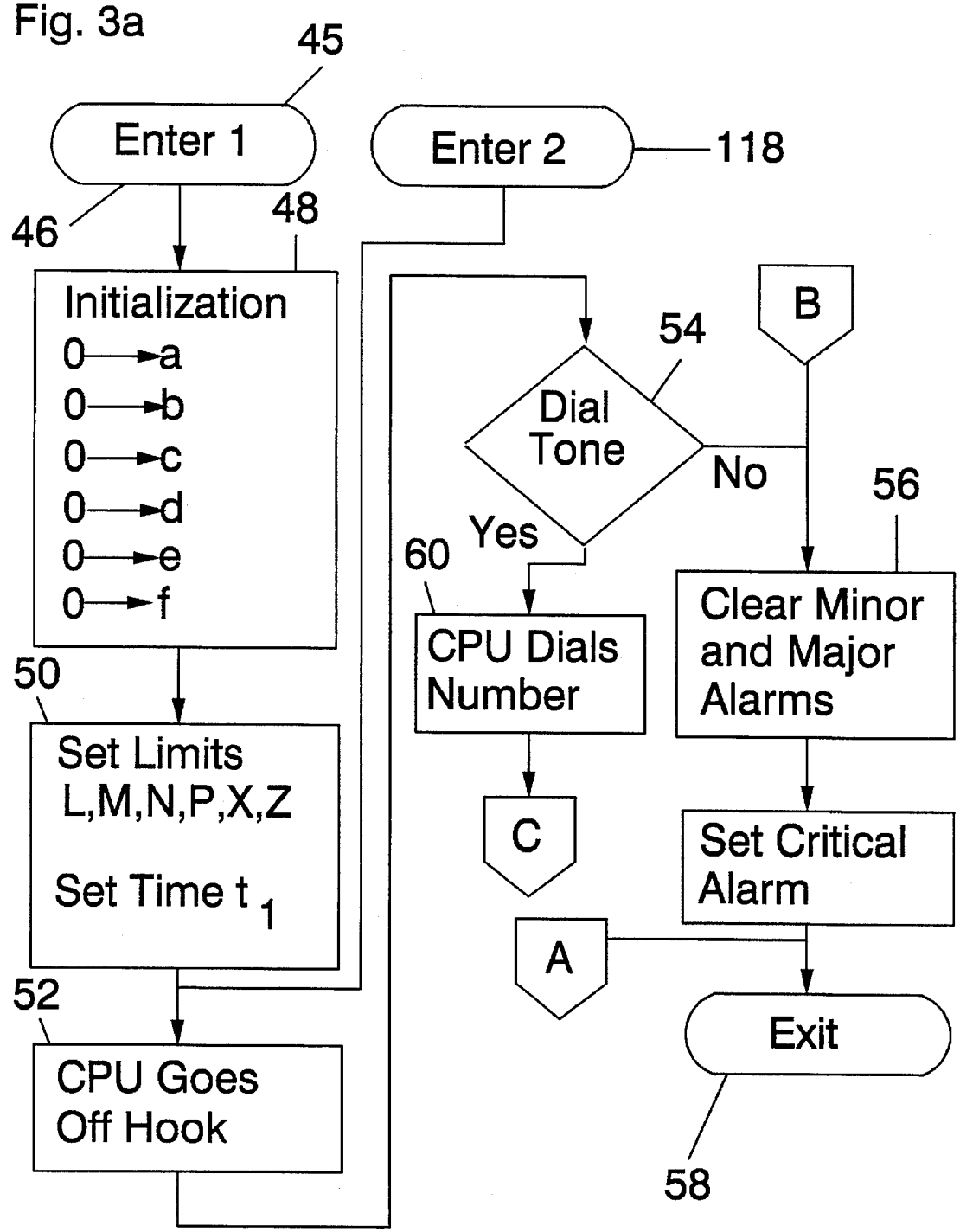
Figure 3B:
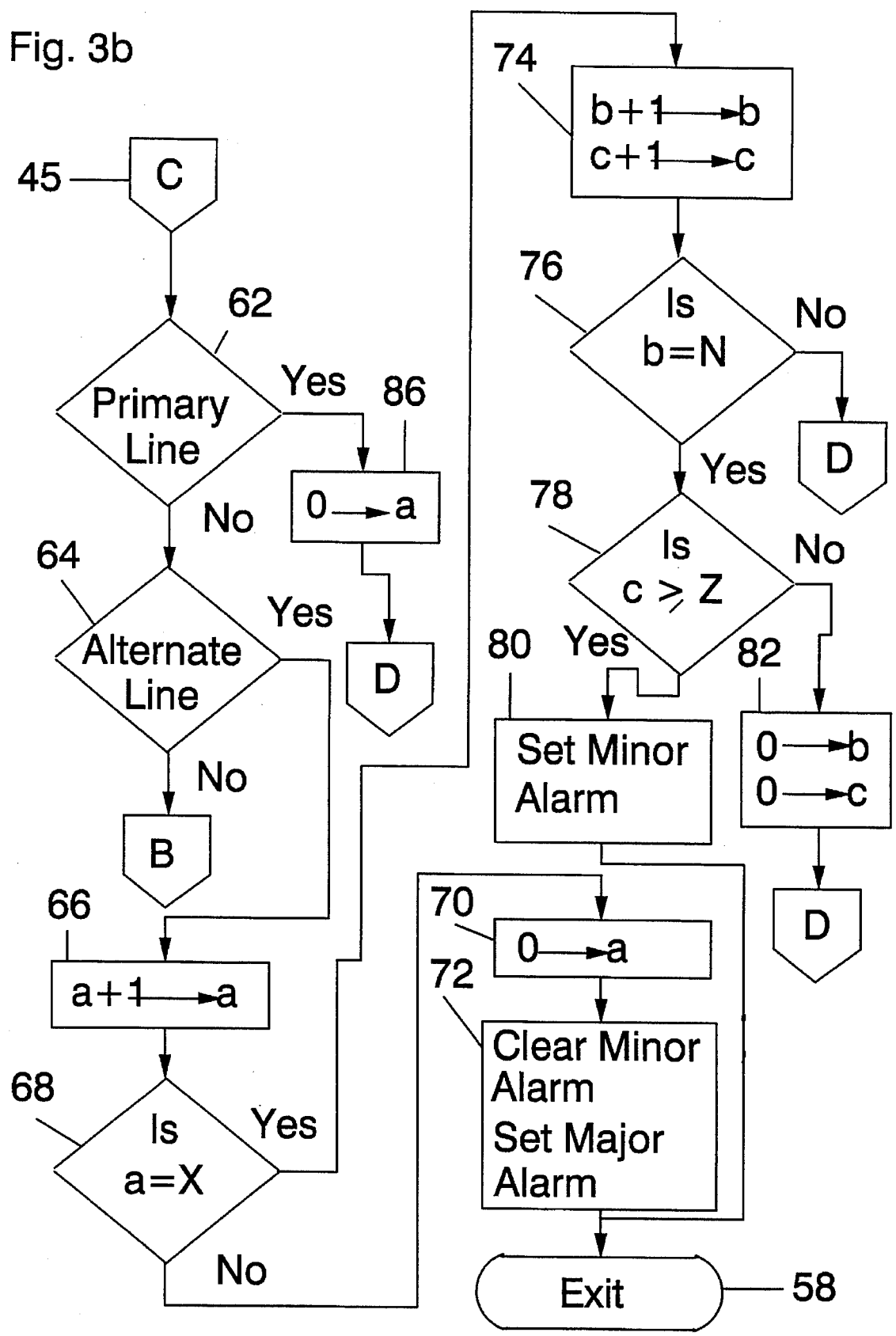
Figure 3D:
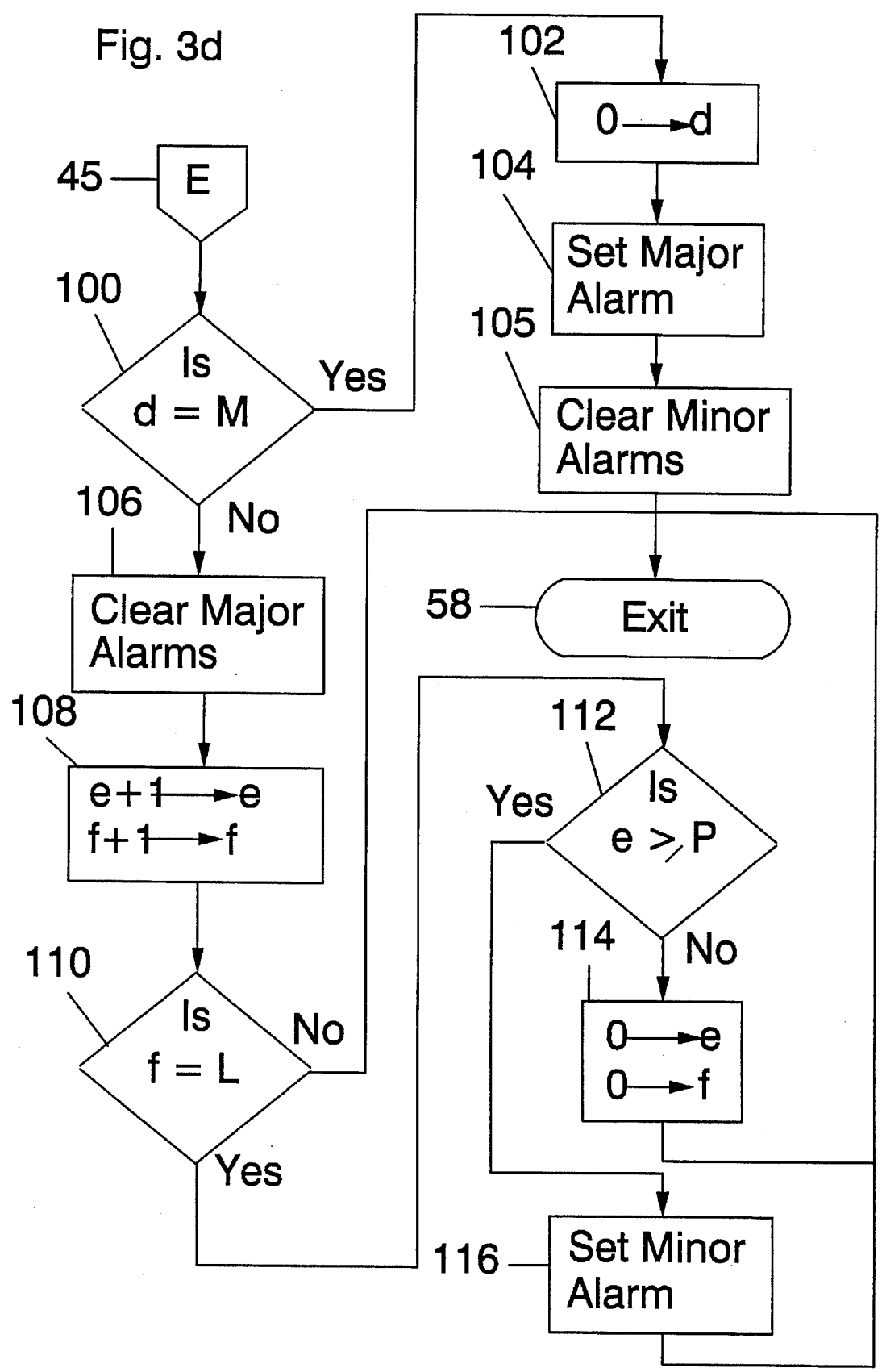

The operation of the diagnostic device 23 in connection with the SCX is discussed in connection with the flow chart of FIG. 3 which constitutes a program 45 for controlling the CPU. As shown, the computer 24 enters the program 45 at location 46 in order to initiate the program during its initial execution in the CPU. The program 45 passes to the location 48 in order to initialize the routine or program 45 such as by storing the value 0 in the locations a, b, c, d, e, and f in the memory of the CPU. The program 45 then passes to the location 50 where the limits L, M, N, P, and Z are selected by the operator of the device 23, and the operator also may select the duration of the time $t_1$ utilized by the program 45. The program 45 may temporarily hold while these limits or parameters are filled into the memory of the CPU through the keyboard 30 of the CPU.

The program 45 then passes to location 52 where the switch sentry 22 goes off hook to the 911 switch SCX, and the switch SCX should provide a dial tone to the switch sentry 22 at the decision 54. In the event that the dial tone is not received by the switch sentry 22, the program 45 passes to the location 56 where the program 45 clears any major or minor alarms, and sets a critical alarm, the highest priority of the alarms, and then exits the program 45 at the location 58. When such an alarm is detected by the operator, the switch SCX may be repaired or replaced before continuing further since the fault in the SCX may degrade the possibility of the SCX to process calls.

In the event that the switch sentry 22 received the dial tone at the decision 54, the program 45 passes on the YES branch to the location 60. At this time, the switch sentry 22 will dial a user programed telephone number (ANI) which may correspond to a sample home telephone number. Using this ANI, the switch SCX will attempt to route the call to the primary PSAP on line 36 based upon a unique Emergency Service Number (ESN) obtained from the incoming ANI which is assigned in a table to route the call to an emergency service zone or geographical area.

At this time, the primary PSAP for this ESN will be set up as a ringing PSAP back to the second modem (COM4) of the switch sentry 22 on the line 36. At the decision 62 in the program 45, if the call on the primary line 36 is not received by the switch sentry 22, the program 45 passes on the NO branch of the decision 62. In the event that the call is also not received on the alternate line 38 then the program 45 passes on the NO branch of the decision 64 to the location 56 where any major and minor alarms are cleared, the critical alarm is set, and the program 45 exits the routine at the location 58.

In the event that the alternate call is received at the decision 64, the program 45 then passes to the location 66 where the variable a in the memory of the CPU, which was initialized to 0 at the location 48, is incremented by 1. The program 45 then passes to the decision 68 where the variable a is compared to the selected parameter X which is set by then operator in the initialization 50. The parameter X is a limit for the consecutive number of times that the call may be placed on the alternate route 38. In the event that the alternate route 38 has been selected X consecutive times, as counted by the variable a, then the program 45 passes to the location 70 where 0 is stored in the variable a in order to clear this variable for subsequent use, the program 45 passes to the location 72 where any minor alarms are cleared, a major alarm is set, and the program 45 exits the routine at the location 58.

In the event that the variable a is not equal to the parameter X at the decision 68, the program 45 passes to the location 74 where the variables b and c, which were originally set to 0 in the initialization 48, are both incremented by 1. The program 45 then checks to determine whether the variable b is equal to the parameter N, which was selected as a limit by the operator at the location 50. The limit N establishes the total number of instances in which the alternate calls are received as determined by the variable b. In the event that the variable b is equal to the parameter N at the decision 76, the program passes on the YES branch to the decision 78 where the value of the parameter c is checked for the condition in which the variable c is greater than or equal to the parameter Z, which was selected by the operator at the location 50. In the event that the variable c is greater than or equal to the parameter Z, then this condition indicates that more than Z alternate calls were obtained corresponding to a total number of N calls, and under this condition the program 45 passes on the YES branch of the decision 78 to the location 80 where a minor alarm is set, and the program exits at the location 58.

In the event that the variable c is less than the limit or parameter Z, then the program 45 passes on the NO branch of the decision 78 to the location 82 where the variables b and c are set to 0 in order to clear these variables for subsequent use in the program 45. The program 45 then passes to the location 84 which will be described below. In the event that the variable b is not equal to the parameter N at the decision 76, the program also passes on the NO branch to the location 64.

In the event that the call on the primary line was received at the decision 62, then the program 45 passes to the location 86 where the variable a is set to 0 for subsequent use in the program 45, and the program 45 then passes to the location 84 where any critical alarms are cleared. The program 45 then passes to the decision 88 where the presence of a voice connection is checked as determined by the carrier detect of the receiving modem. In the event that the voice connection is not obtained, then the program 45 passes to the location 90 where a major alarm is set, the program 45 passes to the location 92 where any minor alarms are cleared, and the program then passes to the exit at the location 58.

In the event that the voice connection was obtained at the decision 88, then the program 45 passes to the decision 94 where the time required for routing is checked against the parameter $t_1$ which was selected by the operator at the location 50 and which constitutes a time limit for the calls, such as longer than 3 seconds. In the event that the time for routing is less than or equal to the time $t_1$, then the program 45 then passes to the location 96 where the critical, major, and minor alarms are all cleared, and the program 45 then exits at the location 58.

In the event that the routing time is greater than the limit $t_1$, then the program 45 passes on the YES branch of the decision 94 to the location 98 where the variable d, which was originally set to 0 in the initialization 48, is incremented by 1. At the decision 100, the current value of the variable d is checked against the parameter M, as selected by the operator at the location 50, and which constitutes a limit for consecutive late calls which are received by the switch sentry 22. In the event that the variable d is equal to the limit M at the decision 100, the program passes on the YES branch to the location 102 where the variable d is set to 0 for subsequent use in the program 45, a major alarm is set at the location 104, all minor alarms are cleared at the location 105, and the program exits the routine at the location 58. This condition indicates that M consecutive late calls were received by the switch sentry 22 from the switch SCX.

In the event that the variable d was not equal to the limit M at the decision 100, the program 45 passes to the location 106 where all major alarms are cleared, and the program 45 then passes to the location 108 where the variables e and f, which were originally set to 0 in the initialization 48, are incremented by 1, after which the program 45 passes to the decision 110.

In the event that the variable f is not equal to the limit or parameter L, which was originally selected by the operator in the initialization 50, then the program 45 passes to the location 58 where the computer exits the routine. The limit L designates the total number L of consecutive late calls. In the event that the number of late calls f is equal to the limit L at the decision 110, then the program 45 passes to the decision 112 where the variable e is checked against the limit or parameter P where e designates the total number of late calls during a total number P of calls. In the event that the variable e is less than the limit P, the program 45 passes to the location 114 where the variables e and f are set to 0 for subsequent use in the program 45, and the program 45 passes to the location 58 where the computer 24 exits the routine. In the event that the variable e is greater than or equal to the limit P, i.e., the total number of late calls exceeds the limit P, the program passes to the location 116 where a minor alarm is set, and the program passes to the exit 58.

Thus, in accordance with the present invention, a critical alarm is set responsive to the following conditions: (1) No dial tone is provided by the 911 switch SCX, or (2) The call is not routed back to the switch sentry 22. A major alarm is set responsive to the following conditions: (1) A voice connection through the switch SCX can not be established, (2) There exists consistent alternate routing of the calls, or (3) There exists consistent slow routing of the calls. A minor alarm is set responsive to the following conditions: (1) There exists occasional alternate routing of the calls, or (2) There exists occasional slow routing of the calls.

After initialization has been completed, the computer 24 then enters the routine 45 at the location 118 in order to avoid further initialization of the variables and parameters until it may be decided to completely begin the program 45 anew. The program 45 passes from the location 118 to the location 52 to carry out the program during this execution of the program 45.

In accordance with the present invention, the diagnostic device 23 resets the appropriate alarm when it determines that the conditions causing the particular alarm are no longer present. The diagnostic device 23 will only close one alarm relay at any given time. The alarm types also escalate. For example, if a minor alarm is present and a critical alarm condition occurs, the minor alarm will be cleared and the critical alarm set. If the critical alarm clears and the minor alarm is still active, the critical alarm will be cleared and the minor alarm will return. All of the alarms may be displayed on the display 32 of the CPU or computer 24.

Thus, in accordance with the present invention, a diagnostic device 23 is provided to continuously monitor a switch SCX and determine whether the SCX has a fault causing an inoperative condition of the switch SCX where such a condition may adversely affect the ability to receive and properly route emergency 911 calls by the SCX.

The foregoing detailed description has been given for clearness of understanding only, and no unnecessary limitations should be understood therefrom, as modifications will be obvious to those skilled in the art.

What is claimed is:

1. A switch sentry device, comprising:
   a digital telephony switch;
   means for processing information;
   means for simulating a call from the processing means to the switch;
   means responsive to the call simulating means for simulating a primary ringing line from the switch to the processing means;
   means responsive to the call simulating means for simulating an alternate ringing line from the switch to the processing means;
   means for determining an inoperative condition of the switch;
   means for determining priority in a plurality of alarms indicating a plurality of fault conditions; and
   means for indicating a condition only of the most critical of the alarms in said priority of alarms.

2. The device of claim 1 including means for setting an alarm responsive to the inoperative condition of the switch.

3. The device of claim 1 including means for forming a dial tone from the switch to the processing means, and in which the processing means sets an alarm responsive to a failure by the switch to provide said dial tone.

4. The device of claim 3 wherein said alarm comprises a critical alarm.

5. The device of claim 1 including means for setting an alarm responsive to failure to detect a primary or alternate ringing line from the switch to the processing device.

6. The device of claim 5 wherein said alarm comprises a critical alarm.

7. The device of claim 1 including means responsive to the condition of lack of a voice connection from the switch to the processing means for setting an alarm.

8. The device of claim 7 wherein said alarm comprises a major alarm.

9. The device of claim 1 including means responsive to the condition of the switch alternate routing a predetermined consecutive number of times for setting an alarm.

10. The device of claim 9 wherein said alarm comprises a major alarm.

11. The device of claim 1 including means responsive to consistent slow routing for setting an alarm.

12. The device of claim 11 wherein said alarm comprises a major alarm.

13. The device of claim 1 including means responsive to the switch occasionally causing alternate routing for setting an alarm.

14. The device of claim 13 wherein said alarm is a minor alarm.

15. The device of claim 1 including means responsive to occasional slow routing by the switch for setting an alarm.

16. The device of claim 15 wherein said alarm comprises a minor alarm.

17. The device of claim 1 including means for setting an alarm responsive to an inoperative condition of the switch, and means for resetting the alarm responsive to elimination of the inoperative condition.

18. The device of claim 17 including a plurality of alarms associated with a plurality of inoperative conditions of the switch, and means for setting only one alarm at a given time.

19. The device of claim 1 including means for setting an alarm of a first high priority responsive to an inoperative condition of the switch, means for setting a second lower priority alarm responsive to an inoperative condition of the switch, and means for clearing the minor alarm in the event of the higher priority alarm.

20. The device of claim 19 including means for resetting the lower priority alarm and clearing the higher priority alarm responsive to a continuing inoperative condition of the switch and an operative condition associated with the higher priority alarm.

21. The device of claim 1 wherein the processing means comprises a computer.

22. The device of claim 21 wherein the simulating means includes a modem in the computer.

23. The device of claim 21 including means for displaying an alarm on a display of the computer responsive to an inoperative condition of the switch.

24. A diagnostic device, comprising:

a digital telephony switch;

a switch sentry device;

means for simulating a call from the sentry device to the switch;

means responsive to the call simulating means for simulating a primary ringing line from the switch to the sentry device;

means responsive to the call simulating means for simulating an alternate ringing line from the switch to the sentry device;

means for determining an inoperative condition of the switch;

means for determining priority in a plurality of alarms indicating a plurality of fault conditions; and means for indicating a condition only of the most critical of the alarms in said priority of alarms.

25. The device of claim 24 including means for indicating the inoperative condition on a display.

* * * * *